United States Patent Office 3,415,637
Patented Dec. 10, 1968

3,415,637
STRENGTHENING GLASS SHEETS
BY ION EXCHANGE
Theodore W. Glynn, Kingsport, Tenn., assignor to American Saint Gobain Corporation, Kingsport, Tenn., a corporation of Delaware
No Drawing. Continuation-in-part of abandoned applications Ser. No. 218,445, Aug. 21, 1962, and Ser. No. 549,828, May 31, 1966. This application June 14, 1967, Ser. No. 645,889
4 Claims. (Cl. 65—30)

ABSTRACT OF THE DISCLOSURE

A small amount of potassium silicate is advantageously added to a molten potassium nitrate bath used in the strengthening of glass sheets by ion exchange techniques. Soda-lime glass cullet can similarly be employed in certain of these molten potassium nitrate baths.

CROSS-REFERENCES TO RELATED APPLICATION

This application is a continuation-in-part of my copending application Ser. No. 549,828, filed May 31, 1966, now abandoned, and also application Ser. No. 218,445, filed Aug. 21, 1962, now abandoned.

BACKGROUND OF THE INVENTION (1) Field of the invention.—The invention relates to an improved method for strengthening glass sheets by ion exchange techniques.

(2) Description of the prior art.—Glass sheets have heretofore been strengthened by employing the well-known ion exchange method wherein glass sheets are immersed in a molten bath of potassium nitrate. After a period of use, however, the potassium nitrate bath inevitably loses its ability to strengthen the glass. Moreover, in some instances, such as with industrial grades of potassium nitrate, a molten bath made therefrom is ineffective in strengthening glass. A need therefore existed in the prior art to ascertain the reason for the ineffectiveness of certain potassium nitrate baths. It was also desirable to be able to economically convert such baths into efficient ion exchange baths for strengthening glass.

SUMMARY OF THE INVENTION

It has been found that whenever a molten potassium nitrate bath becomes contaminated through use and therefore loses its ability to strengthen glass by ion exchange, the addition of potassium silicate to the bath effects a decontamination of the bath. The decontaminated bath then becomes capable of strengthening glass. If desired, the potassium silicate can be added to a potassium nitrate bath before it becomes contaminated through use, thereby extending the useful life of the bath. It has also been found that industrial grades of potassium nitrate, which are not sufficiently pure to strengthen glass by ion exchange, may be purified by adding potassium silicate to a molten bath thereof. The purified bath is capable of strengthening glass by ion exchange.

It has further been found that soda-lime glass cullet will effect decontamination of a potassium nitrate bath so long as the purity of the bath is at least about 99.9%.

DESCRIPTION OF THE PREFERRED EMBODIMENTS

In carrying out this invention, the preferred salt bath is potassium nitrate, although the salts of other monovalent alkali metals such as rubidium, caesium, and thallium can be used. However, the ions of these other metals are all larger than potassium, and, therefore, more time is required to effect the exchange. Additionally, the other metals are all more expensive, and the salts of thallium are poisonous, so potassium is the preferred alkali metal.

Although potassium nitrate best meets the requirements of the molten salt bath, the salts of other alkali metals, such as the chlorides and sulfates of sodium may also be added to reduce the cost of the bath.

In practicing this ion exchange method, it has been determined that the potassium nitrate must be relatively uncontaminated and presently available industrial grades of potassium nitrate do not effectively exchange potassium ions with glass. Glass treated with these industrial grades of potassium nitrate is not strengthened. Furthermore, glass treated in a bath of the industrial grade potassium nitrate is stained. The failure of the available industrial grades of potassium nitrate to strengthen the glass is believed to result from the presence of small amounts of contaminating elements such as lithium, calcium, and magnesium in the potassium nitrate. These contaminated elements appear to inhibit the potassium ion exchange between the glass and the salt and thereby prevent strengthening of the glass. It is possible to successfully strengthen a glass sheet by ion exchange in a bath of a reagent grade of potassium nitrate since this grade is relatively free of the contaminants present in the industrial grade. However, the cost of the reagent grade is more than six times greater than the cost of industrial grade of potassium nitrate, and, therefore, its use for glass strengthening is not commercially feasible.

In order to determine the effect of lithium, calcium, and magnesium in potassium nitrate on the strengthening of glass sheets by ion exchange, tests were run in which a potassium nitrate bath was contaminated with these elements. In one test, a single strength window glass sample was treated in a bath of uncontaminated potassium nitrate and a tensile stress of .504 kg./mm.$^2$ was obtained. Controlled amounts of lithium chloride were then added to the bath and it was found that the addition of 20 p.p.m. reduced the stress in the treated glass to .376 kg./mm.$^2$. An addition of 30 p.p.m. of lithium chloride reduced the stress in the treated glass to 1325 kg./mm.$^2$.

In another test, 0.05% magnesium nitrate was added to an uncontaminated potassium nitrate bath and a single strength window glass sample was treated for 20 hours at 485° C. The tensile stress of the sample in this bath was so low that it could not be read on the test equipment. The effect of calcium on the ability of potassium nitrate to strengthen glass was determined by adulterating an uncontaminated potassium nitrate bath with 0.025% calcium nitrate. A single strength window glass sample treated for 20 hours in this bath at 485° C. had a stress of only .0265 kg./mm.$^2$.

In view of the inability of the industrial grades of potassium nitrate to successfully cause potassium ion exchange between the bath and the surface of the glass, I have developed methods of treating industrial potassium nitrate so as to decontaminate or purify it and thereby render it usable for strengthening glass sheets by ion exchange.

Industrial grades of potassium nitrate generally contain about 99%, or more, of potassium nitrate. Additions of up to 2% potassium silicate have been found to be effective in decontaminating molten baths of these industrial grades of potassium nitrate. Potassium nitrates which are less than 99% pure have required higher amounts of potassium silicate in order to effect decontamination.

The amount of potassium silicate to be added depends upon the purity of the potassium nitrate, as readily determined by those skilled in the art. For example, when the purity of the potassium nitrate is about 99.9%, normally about 0.1% potassium silicate is sufficient to decontaminate the potassium nitrate. When the purity of the potassium nitrate is 99.0%, about 1% potassium silicate is sufficient to decontaminate the potassium nitrate. The amount of potassium silicate added is not at all critical in the sense that too much can be added. For example, when 1% potassium silicate is added to a molten potassium nitrate bath which possesses a purity higher than 99.0%, there are no apparent adverse effects. Therefore, in all cases wherein the purity of the potassium nitrate is 99% or more, the addition of 1% or even 5% potassium silicate satisfactorily decontaminates the potassium nitrate. It is somewhat less economical, however, to employ more potassium silicate than is required.

Since the amount of potassium silicate which is necessary to decontaminate the potassium nitrate is essentially dependent upon the purity of the potassium nitrate, more than 1% potassium silicate is ordinarily employed with potassium nitrates having a purity of less than 99.0% in accordance with the teachings of this invention. With respect to any potassium nitrate bath which is incapable of strengthening glass, one can readily determine the most advantageous amount of potassium silicate to use by simply increasing the quantity of the potassium silicate in the bath until the bath becomes capable of strengthening glass. It is believed that the potassium silicate reacts with the impurities in the potassium nitrate bath and that silicates formed precipitate out of solution due to their higher melting point or lower solubility.

Examples of typical industrial grade potassium nitrates, to which potassium silicate may advantageously be added in accordance with this invention, are N.F. grade manufactured by Stauffer Chemical Company, and technical grade manufactured by Southwest Potash Company, which are designated A and B, respectively, in the following description.

A typical analysis of the N.F. grade salt shows that it contains 99.9% $KNO_3$ and 0.1% total impurities. The minimum $KNO_3$ content of the technical grade salt is 99.0% and this salt therefore includes 1.0% total impurities. The impurity content of both salts is sufficiently high to inhibit ion exchange and lithium, calcium and magnesium exist as impurities in both salts.

The following tests are representative of the manner in which potassium silicate is capable of decontaminating a bath of molten potassium nitrate:

Single strength window glass samples were tested in a bath of the A salt at various temperatures ranging from 400° C. to 500° C. and the treated glass samples showed staining and no strengthening. The same salt was then melted to a temperature of 485° C. and 1% by weight of potassium silicate was stirred into the molten bath. Single strength window glass samples were then emersed in the bath for 20 hours. Upon removal from the bath, the treated glass was free from stain and surface attack, and the stress at the center of the sheet was .424 kg./mm.$^2$ which compares with a stress of .0795 kg./mm.$^2$ on the same glass before treatment. The test was repeated with the addition of 0.1% by weight of potassium silicate at 485° C. for 20 hours and the stress obtained was .769 kg./mm.$^2$.

Single strength window glass was also treated in an N.F. grade salt obtained from another supplier at 485° C. for 20 hours and the treated glass showed less stress than before treatment and was heavily stained. The same salt was then treated by adding 0.05% by weight of potassium silicate to the bath and the same glass was treated at 485° C. for 20 hours. The measured stress after treatment in the activated bath was .822 kg./mm.$^2$ which is slightly higher than the stress obtained by treating the same glass in the A salt activated by the addition of 0.1% potassium silicate.

Single strength window glass was also treated in a bath of the B salt for various times and at various temperatures and no strengthening was obtained and staining occurred in all cases. The same salt was then activated by adding 0.1% by weight of potassium silicate to the molten bath and the glass was treated in this bath for 20 hours at 485° C. No staining occurred, but the stress produced was only .292 kg./mm.$^2$. A further addition of 0.15% potassium silicate increased the stress to .398 kg./mm.$^2$, and a further addition of 0.75% potassium silicate produced a stress in the glass of .769 kg./mm.$^2$. It is thus apparent that an addition of 1% potassium silicate to the B salt permits the obtention of approximately the same stress in the glass as is obtained by treating the A salt with 0.1% potassium silicate.

In order to ascertain whether the addition of additional potassium silicate to the B salt would increase the stress of a sample treated therein, an additional 1% potassium silicate was added to the bath and the glass was treated at 485° C. for 20 hours. After this treatment, the glass had a tensile stress of .795 kg./mm.$^2$ thus indicating that additional potassium silicate does not materially increase the tensile stress.

Another method which has been found to be effective for activating the A salt only is the treatment of a bath of this salt with soda-lime glass cullet for about 20 hours at approximately 425° C. After treatment, the cullet is removed from the bath, and the bath will exchange ions with the glass surface. It is believed that the impurities pass from the bath to the cullet by the mechanism of ion exchange.

The use of cullet to activate only the A salt is based upon the following comparative tests. Approximately 150 pounds of A salt was melted and held at 425° C. Samples of window glass were then treated in this salt for 20 hours, and no strengthening was obtained; but all samples were stained. The bath was then treated with an equal volume of crushed soda-lime glass cullet having a particle size of about ¼" cubical at 425° C. for 20 hours. The cullet was removed from the bath and samples of single strength window glass were treated at 425° C. for 20 hours and the treated glass had a stress of .636 kg./mm.$^2$. The B salt was also melted and held at 425° C. after which glass samples were treated. The treated samples showed no strengthening and heavy stain occurred. The bath was then treated with cullet twice for 17 hours at 425° C. and no improvement in stress was obtained on samples treated in this bath. Another cullet treatment was then carried out at 485° C. for 16 hours, and glass samples were tested in this salt at 425° C. for 65 hours. A stress of only .106 kg./mm.$^2$ was obtained in the treated samples thereby showing that cullet treatment is not effective on the B salt.

To confirm that the B salt is not activated by treatment with soda-lime glass cullet, both window and plate glass samples were treated for 20 hours at 425° C. after which glass samples were treated for 90 hours at 425° C. No strengthening was obtained in these samples and, in fact, the stress decreased. The same bath was then treated with fresh cullet at 485° C. for 96 hours after which glass samples were treated for 20 hours at 485° C., and the measured stress was only .0265 kg./mm.$^2$ which is the same as the stress obtained after the first 24 hour cullet treatment. The B salt received a total of 120 hours cullet treatment with 24 hours at 425° C., and 96 more hours at 485° C. and no strengthening was obtained in the treated glass. Hence, it is evident that B salt is not activated by treatment with soda-lime glass cullet.

Fractional distillation has also been successfully used to activate industrial grade salts for strengthening glass by ion exchange. Purification by distillation requires heating the salt to a temperature about 100° C. higher than the maximum temperatures used for the strengthening process which are 475° C. to 485° C. and holding the molten bath at this temperature for approximately 24 hours. This method is also effective only for the currently available A salt. In order to show the feasibility of fractional distillation as a means for activating the various grades of industrial salts, samples of single strength window glass and ⅛ inch crystal glass were treated for 64 hours in the A salt at 500° C. The measured stress in the samples was .0265 kg./mm.$^2$ which is less than the stress before treatment. The same salt was then melted and held at 575° C. for 23 hours after which the temperature was lowered to 485° C. and samples of single strength glass were emersed for 23 hours. The stress was found to be .808 kg./mm.² This procedure was repeated and the measured stress in the glass was .822 kg./mm.² The B salt was melted and held at a temperature of 575° C. for a period of 20 hours. The temperature was then lowered to 485° C. and samples of single strength window glass were treated for 20 hours after which the stress in the samples was found to be zero. The B salt was then melted and held at the temperature of 600° C. for 20 hours after which the temperature was lowered to 485° C. and samples of single strength window glass were treated for 20 hours. The stress readings on the treated samples were still zero. These tests show that the B salt cannot be activated by fractional distillation even though the temperature used is higher than the temperature which will activate the A salt.

As well known to those skilled in the art, the glass sheets employed in accordance with this invention are advantageously immersed in the potassium nitrate bath from about 2 to 48 hours, and the temperature of the bath is maintained below the strain point of the sheet.

Examples of the types of glass which may be strengthened according to the present invention are listed in Table 1 of my copending application Ser. No. 549,828, filed May 31, 1966. Ordinarily such glass sheets contain about 4 to 17% $Na_2O$. Other sodium-bearing glasses, of course, may also be employed, whether in sheet form or not, as well known to those skilled in the art.

I claim:

1. In a process for strengthening glass sheets by ion exchange, wherein at least a portion of a glass sheet is immersed in a molten bath of potassium nitrate, the improvement which comprises adding a sufficient amount of potassium silicate to said bath, so as to maintain the capability of the bath to strengthen the glass sheets.

2. The method of claim 1 wherein the amount of potassium silicate added is from about 0.1%–2% by weight and the molten bath contains from about 99%–99.9% by weight of potassium nitrate.

3. In a process for strengthening glass sheets by ion exchange, wherein at least a portion of a glass sheet is immersed in a molten bath of potassium nitrate wherein the bath contains at least about 99.9% potassium nitrate by weight, the improvement which comprises adding soda-lime glass cullet thereto in an amount sufficient to maintain the capability of the bath to strengthen the glass sheets.

4. The process of claim 1 wherein the molten bath of potassium nitrate is contaminated to the extent that it is incapable of strengthening the glass sheet prior to the addition of potassium silicate and wherein a sufficient amount of potassium silicate is added to the bath so that the bath is decontaminated to the extent that it is then capable of strengthening the glass sheet.

References Cited

UNITED STATES PATENTS

| | | | |
|---|---|---|---|
| 3,293,016 | 12/1966 | Cornelissen | 65—30 |
| 3,356,477 | 12/1967 | Chisholm et al. | 65—30 |
| 3,287,200 | 11/1966 | Hess et al. | 65—30 X |

DONALL H. SYLVESTER, *Primary Examiner.*

R. L. LINDSAY, *Assistant Examiner.*